(12) United States Patent
Park et al.

(10) Patent No.: US 6,714,799 B1
(45) Date of Patent: Mar. 30, 2004

(54) METHOD AND SYSTEM FOR USING SIM CARD IN CDMA SERVICE AREA

(75) Inventors: Jeon-Man Park, Songnam-shi (KR); Kyung-Yun Roo, Taegukwangyokshi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/436,286

(22) Filed: Nov. 8, 1999

(30) Foreign Application Priority Data

Nov. 7, 1998 (KR) .......................................... 98-47700

(51) Int. Cl.⁷ .............................................. H04M 1/00
(52) U.S. Cl. ................... 455/558; 455/406; 455/432.1; 455/552.1; 370/335
(58) Field of Search ................................ 455/432, 435, 455/426, 550.1, 551, 552.1, 558, 557, 575, 90, 411, 406, 408; 370/335, 342, 441

(56) References Cited

U.S. PATENT DOCUMENTS

| | | | | |
|---|---|---|---|---|
| 5,537,474 A | * | 7/1996 | Brown et al. ................... | 380/23 |
| 5,564,068 A | * | 10/1996 | Nguyen ....................... | 455/433 |
| 5,610,974 A | | 3/1997 | Lantto | |
| 5,907,804 A | | 5/1999 | Schroderus et al. | |
| 5,913,175 A | | 6/1999 | Pinault | |
| 5,940,512 A | * | 8/1999 | Tomoike ...................... | 380/248 |
| 5,987,325 A | * | 11/1999 | Tayloe ......................... | 455/435 |
| 6,058,301 A | * | 5/2000 | Daniels ........................ | 455/411 |
| 6,097,937 A | * | 8/2000 | Sawyer ........................ | 455/406 |
| 6,119,020 A | * | 9/2000 | Miller et al. .................. | 455/558 |
| 6,201,957 B1 | * | 3/2001 | Son et al. .................... | 455/406 |
| 6,330,443 B1 | * | 12/2001 | Kirby .......................... | 455/432 |
| 6,490,449 B1 | * | 12/2002 | Thibert et al. ............... | 455/433 |

FOREIGN PATENT DOCUMENTS

| | | | | | |
|---|---|---|---|---|---|
| GB | 22880085 A | * | 1/1995 | ............ | H04Q/7/22 |
| GB | 2304497 A | * | 3/1997 | ............ | H04Q/7/22 |
| GB | 2 350 017 A | * | 11/2000 | ............ | H04Q/7/22 |
| GB | 2 352 935 A | * | 2/2001 | .......... | H04M/15/00 |

* cited by examiner

Primary Examiner—Charles Appiah
(74) Attorney, Agent, or Firm—Dilworth & Barrese LLP

(57) ABSTRACT

A system for allowing a GSM subscriber to use a SIM card in a CDMA service area. A CDMA terminal having a mountable SIM card, includes a SIM interface for interfacing between the SIM card and a controller of the CDMA terminal. The CDMA terminal reads unique subscriber information for SIM card verification from the SIM card and sends the read unique subscriber information, when the SIM card is mounted therein, and enables the SIM card upon receipt of verification for the SIM card. A CDMA subsystem sends a verification confirm request for the SIM card to a GSM subsystem using the unique subscriber information and information about a predetermined agreement with a GSM system upon receipt of the unique subscriber information for SIM card verification; and assigns a unique virtual management number for the CDMA terminal mounted with the SIM card and sends SIM card verification to the CDMA terminal when the GSM subsystem verifies the SIM card. The GSM subsystem verifies the SIM card in response to the verification confirm request for the SIM card and sends the verification result to the CDMA subsystem. A public network connects the CDMA subsystem and the GSM subsystem.

21 Claims, 15 Drawing Sheets

METHOD AND SYSTEM FOR USING SIM CARD IN CDMA SERVICE AREA

PRIORITY

This application claims priority to an application entitled "Using SIM Card in CDMA Service Area" filed in the Korean Industrial Property Office on Nov. 7, 1998 and assigned Ser. No. 98-47700, the contents of which are hereby incorporated by reference.

BACKGROUND OF THE INVENTION

1. Field of the Invention

The present invention relates generally to a mobile communication system, and in particular, to a system and method for allowing a GSM subscriber to use a SIM card even in a CDMA service area.

2. Description of the Related Art

Unlike a code division multiple access (CDMA) terminal, a GSM (Global System for Mobile communication) terminal has a subscriber identity module (SIM) card mounted in it. The SIM card, which is a smart card detachable from the terminal, includes therein a microprocessor and a memory chip for storing various information of the user. The SIM card is divided into an IC (Integrated Circuit) card type and a plug-in type. On the SIM card are stored subscriber information and information loaded in a pre-personalization state. The subscriber information may include:

Serial Number
Service Code
Block/Unblocking Status
(Pre-)Personalization Data
Authentication Algorithm Parameter
Authentication Key
Encryption Algorithm
IMSI (International Mobile Subscriber Identity)
(Pre-)Personalization and Re-personalization Key
Cipher Key
Cipher Sequence Number
TESI (Temporary Mobile Subscriber Identity)
LAI (Location Area Identity)
Location Update Time
Update State
Forbidden PLMN (Public Land Mobile Network) List
Access Control Class
PIN (Personal Identification Number)
PIN Error Count
PUK (Personal Unblocking Key)
Abbreviated Dialing
Barring Outgoing Calls Further, the IMSI includes an MCC (Mobile Country Code), an MNC (Mobile Network Code) and an MSIN (Mobile Subscriber Identification Number).

A GSM terminal (or GSM phone), using the SIM card, operates in a communication method different from that of a CDMA terminal (or CDMA phone). Therefore, users of the GSM terminal cannot use their own SIM card when traveling to a CDMA service area. In this case, the user conventionally leases a CDMA terminal (phone) from a service provider and this inconveniences the user with an additional charge. Furthermore, the user cannot use various additional services registered in the SIM card, such as an abbreviated dialing function. Therefore, there has been a demand for a method capable of allowing the GSM subscriber to use his SIM card even in a CDMA service area.

SUMMARY OF THE INVENTION

It is, therefore, an object of the present invention to provide a system and method for allowing GSM subscribers to use their SIM card even in a CDMA service area.

It is another object of the present invention to provide a CDMA terminal (phone) mounted with a SIM card for use in a non-GSM service area, and a method for controlling the same.

To achieve the above objects, there is provided a system for allowing a GSM subscriber to use a SIM card in a CDMA service area. In the system, a CDMA terminal having a mountable SIM card, includes a SIM interface for interfacing between the SIM card and a controller of the CDMA terminal. The CDMA terminal reads unique subscriber information for SIM card verification from the SIM card and sends thee unique subscriber information, when the SIM card is mounted therein, and enables the SIM card upon receipt of verification for the SIM card. A CDMA subsystem sends a verification confirm request for the SIM card to a GSM subsystem using the unique subscriber information and information about a predetermined agreement with a GSM system upon receipt of the unique subscriber information for SIM card verification; and assigns a unique virtual management number for the CDMA terminal mounted with the SIM card and sends SIM card verification to the CDMA terminal when the GSM subsystem verifies the SIM card. The GSM subsystem verifies the SIM card in response to the verification confirm request for the SIM card and sends the verification result to the CDMA subsystem. A public network connects the CDMA subsystem and the GSM subsystem.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

A preferred embodiment of the present invention will be described. hereinbelow with reference to the accompanying drawings. In the following description, well known functions or constructions are not described in detail since they would obscure the invention in unnecessary detail.

Figure 1:
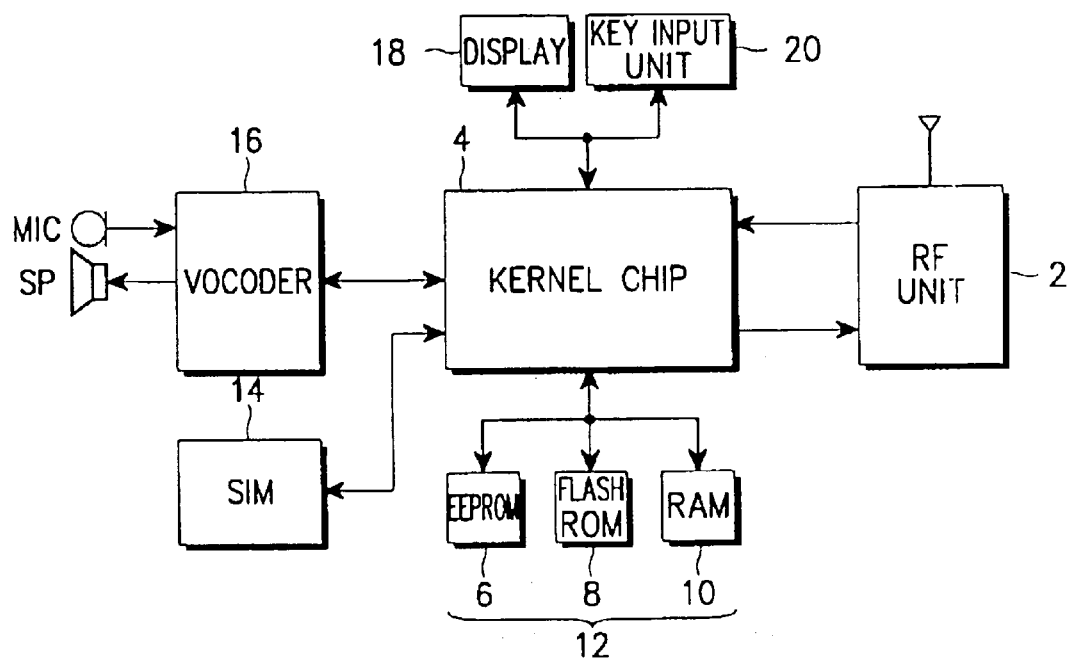
FIG. 1 is a block diagram illustrating a general GSM terminal.
Figure 2:
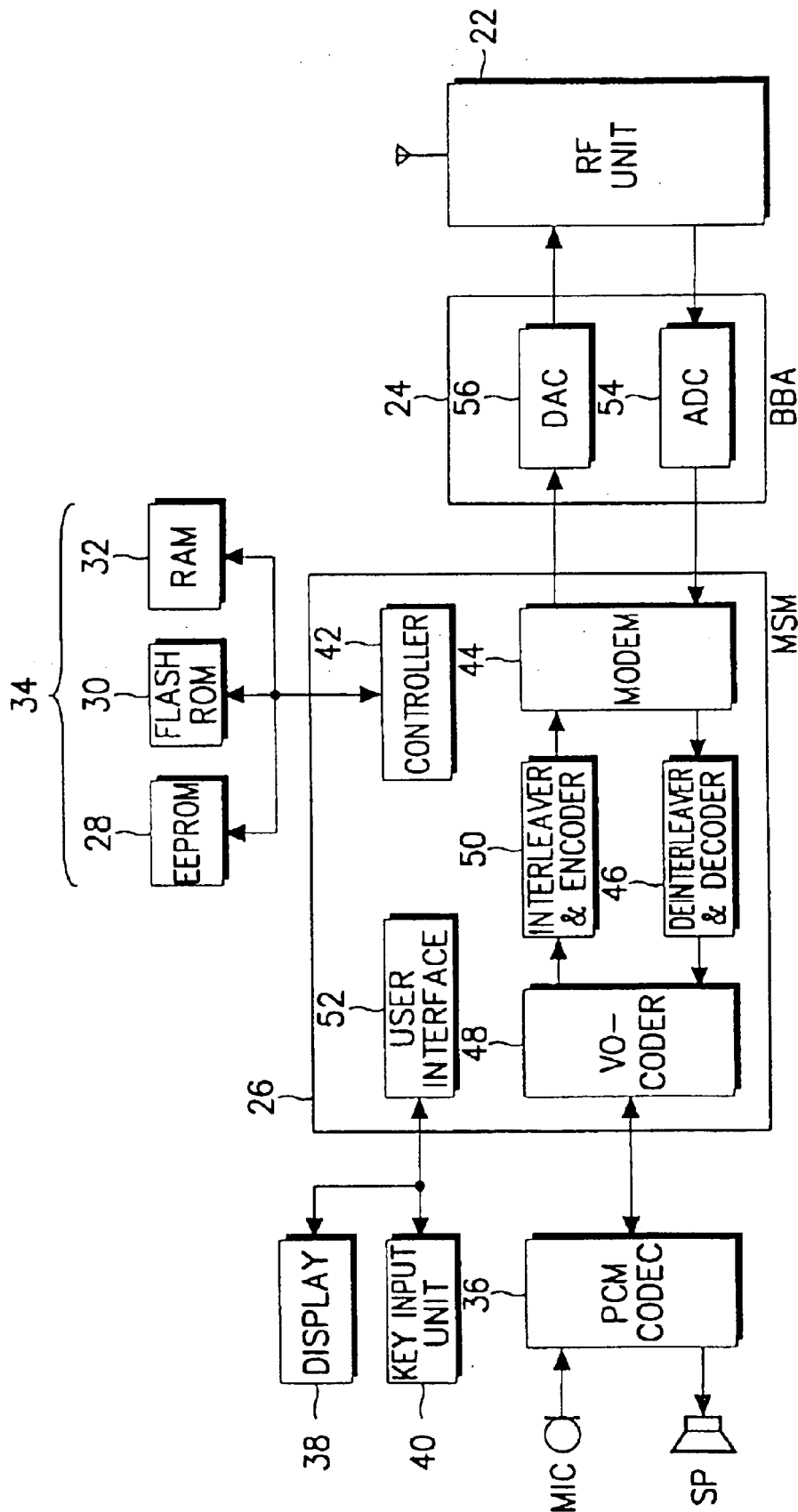
FIG. 2 is a block diagram illustrating a general CDMA terminal.

FIGS. 1 and 2 illustrate block diagrams of a general GSM terminal and a general CDMA terminal, respectively. First, referring to FIG. 1, a GSM terminal includes an RF (Radio Frequency) unit 2, a kernel chip 4, an EEPROM (Electrically Erasable and Programmable Read Only Memory) 6, a flash ROM 8, a RAM (Random Access Memory) 10, a SIM card 14, a vocoder 16, a microphone MIC, a speaker SP, a display 18 and a key input unit 20. Here, the EEPROM 6, the flash ROM 8 and the RAM 10 constitute a memory 12. The RF unit 2 modulates an RF signal to be transmitted via an antenna and demodulates an RF signal received via the antenna. The kernel chip 4, comprised of a controller, a SIM interface, a kernel coder/decoder, an adaptive equalizer and an RF interface, controls an overall operation of the GSM terminal. A display 18, under the control of the kernel chip 4, displays key data input from the key input unit 20, an operating state of the GSM terminal, and various information in character and icon. The key input unit 20 including numeric keys, and function keys, outputs key data corresponding to a key pressed by a user and provides the key data to the kernel chip 4. The memory 12, comprised of the EEPROM 6, the flash ROM 8 and the RAM 10, stores various data required in operating the GSM terminal. The SIM card 14, which is detachable from the terminal, includes therein a microprocessor and a memory chip for storing various user information. The vocoder 16, including a speech coder/decoder, codes and decodes a voice signal.

Next, referring to FIG. 2, a CDMA terminal includes an RF unit 22, a BBA (Base-Band Analog) circuit 24, an MSM (Mobile Station MODEM (MOdulator & DEModulator) 26, an EEPROM 28, a flash ROM 30, a RAM 32, a PCM (Pulse Code Modulation) codec 36, a microphone MIC, a speaker SP, a display 38 and a key input unit 40. Here, the EEPROM 28, the flash ROM 30 and the RAM 32 constitute a memory 34. The MSM 26 includes a controller 42, a MODEM 44, a deinterleaver and decoder 46, a vocoder 48, an interleaver and encoder 50, and a user interface 52. Further, the BBA circuit 24 is comprised of a digital-to-analog converter (DAC) 56 and an analog-to-digital converter (ADC) 54. The RF unit 22 down-converts an RF signal received at an antenna into an intermediate frequency (IF) signal and provides the IF signal to the ADC 54 in the BBA circuit 24. Further, the RF unit 22 up-converts an IF signal output from the DAC 56 in the BBA circuit 24 into an RF signal and transmits the RF signal over the antenna. The ADC 54 in the BBA circuit 24 converts an analog signal to a CDMA digital signal to provide the converted digital signal to the MSM 26, and the DAC 56 converts a CDMA digital signal to an analog signal to provide the converted analog signal to the RF unit 22.

The CDMA MODEM 44 in the MSM 26 performs CDMA demodulation and symbol combining for a digital signal output from the ADC 54 in the BBA circuit 24 and provides the symbol combined digital signal to the deinterleaver and decoder 46. Further, the CDMA MODEM 44 performs a reverse operation for a signal output from the interleaver and encoder 50. The deinterleaver and decoder 46 deinterleaves and decodes the symbol combined data to generate error corrected data bits, and outputs the error corrected data bits in a data packet format to the vocoder 48 under the control of the controller 42. The interleaver and encoder 50 interleaves and encodes data output from the vocoder 48 and provides the output data to the MODEM 44. The vocoder 48 decodes data packet input from the deinterleaver and decoder 46 into PCM voice data and provides the PCM voice data to the PCM codec 36. Further, the vocoder 48 performs a reverse operation for PCM voice data input from the PCM codec 36.

The PCM codec 36 converts the PCM voice data output from the vocoder 48 to an analog voice signal and provides the analog voice signal to the speaker SP. The speaker SP converts the analog voice signal to an audible signal. The microphone MIC provides an analog voice signal input by the user to the PCM codec 36. It can be appreciated from FIGS. 1 and 2 that the CDMA terminal is fundamentally different from the GSM terminal in that the CDMA terminal does not include a SIM card. Therefore, the CDMA terminal of FIG. 2 cannot use the various information in the SIM card 14 of the GSM terminal.

For this reason, a GSM subscriber cannot use his or her own SIM card in a CDMA service area (i.e., when traveling to the CDMA service area). Therefore, there is a demand for a CDMA terminal which can support the SIM card in the CDMA service area. In the embodiment, a SIM card is attachable to and detachable from the CDMA terminal so that the GSM subscriber may mount (or insert) his own SIM card in the CDMA terminal to use SIM information stored in the SIM card.

Figure 3:
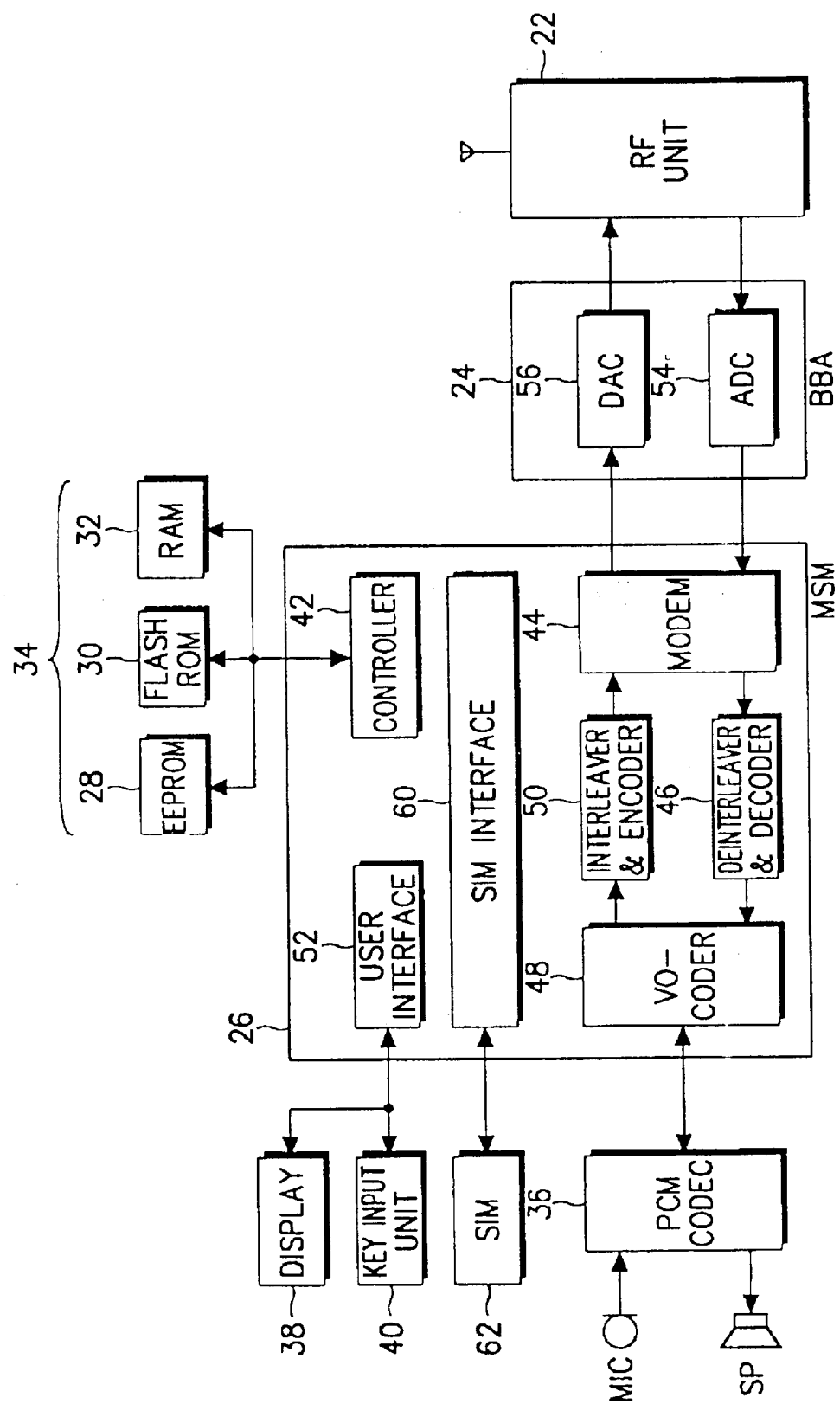
FIG. 3 is a block diagram illustrating a CDMA terminal mounted with a SIM card according to an embodiment of the present invention.

FIG. 3 illustrates a CDMA terminal which can support a SIM card according to an embodiment of the present invention. It is noted that the CDMA terminal of FIG. 3 additionally includes a SIM card 62 and a SIM interface 60, compared with the general CDMA terminal of FIG. 2. The SIM interface 60 is preferably built in the MSM 26. In addition to the function of a SIM interface in the general GSM terminal, the SIM interface 60 interfaces between the MSM 26 and the SIM card 62.

Figure 4:
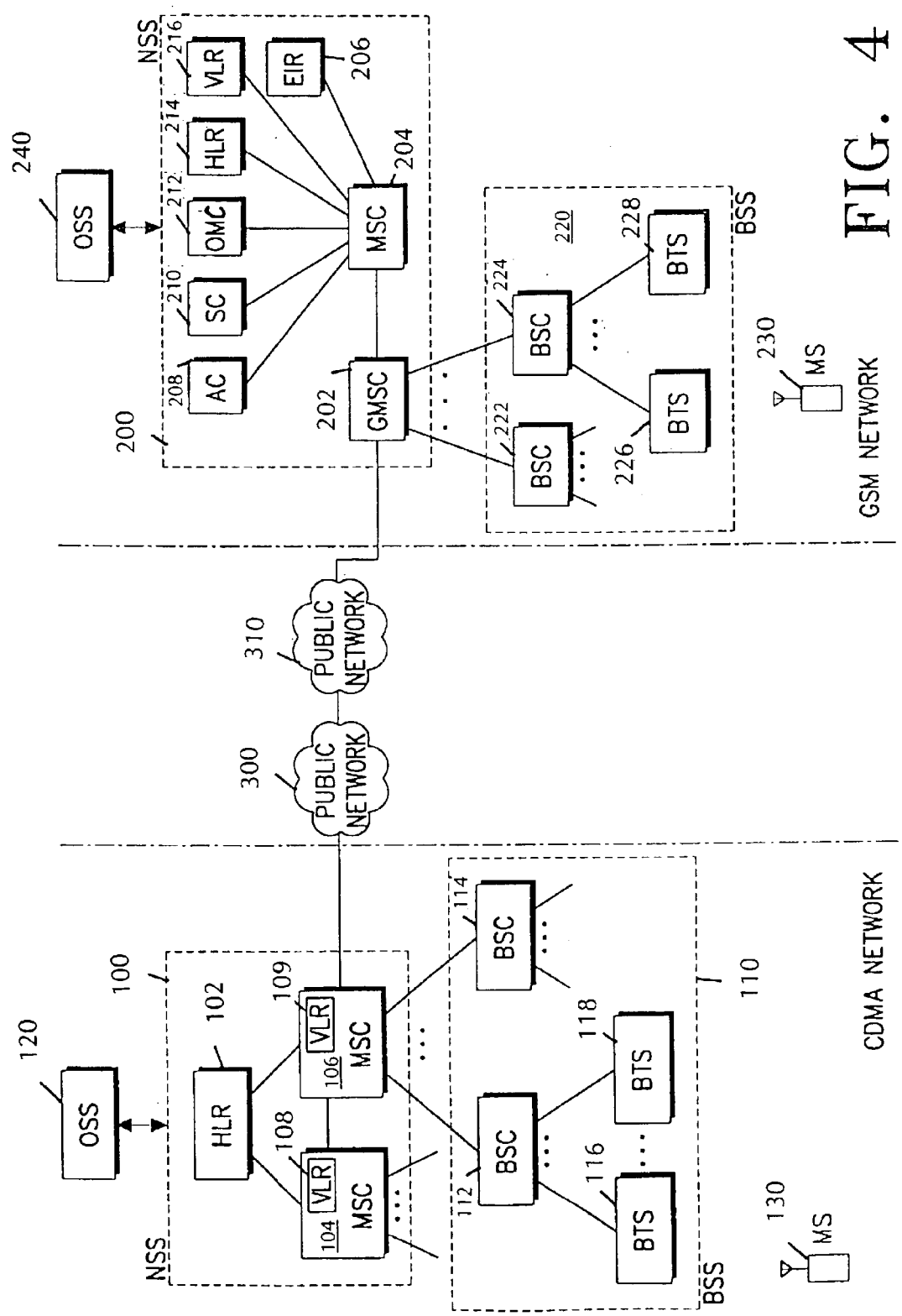
FIG. 4 is a diagram illustrating the connection between a CDMA network and a GSM network via a public network, to which the present invention is applied.

FIG. 4 illustrates the connection between a CDMA network and a GSM network via a public network, to which the present invention is applied.

The CDMA network is comprised of an NSS (Network and Switching Subsystem) 100, a BSS (Base Station Subsystem) 110, an OSS (Operating SubSystem) 120 and a plurality of MSs (Mobile Stations) 130. The NSS 100 includes an HLR (Home Location Register) 102 and MSCs (Mobile Switching Centers) 104, 106, and the BSS 110 includes BSCs (Base Station Controllers) 112, 114 and BTSs (Base station Transceiver Subsystems) 116, 118.

In the CDMA network, one public land mobile network (PLMN) works with several HLRs 102 and MSCs 104, 106 to perform subscriber management and call exchange. The PLMN is a network including more than one CDMA network. Each HLR 102 is connected to several MSCs 104, 106; each MSC 106; is connected to multiple BSCs 112, 114; and each BSC 112 is connected to multiple BTSs 116, 118. The MSC 104, 106 controls connection to the BSCs 112, 114, the public network and the PLMN. The BSC 112, 114 controls a radio link and performs a handoff. The BTS 116, 118, together with the MSs 130, forms a radio channel and manages radio resources. Further, the HLR 102 manages subscriber's location registration. A VLR (Visitor Location Register) 108, 109 provided to each MSC 104, 106, is a database for temporarily storing information about an MS located in a service area of the corresponding MSC. When the MS travels to another service area, the MS information stored in the corresponding VLR is deleted. The OSS 120 installed in every network, performs operation and maintenance of the corresponding network, billing, and management of subscribers and the MSs.

Similarly, the GSM network is comprised of an OSS 240, an NSS 200, a BSS 220 and multiple MSs 230. BSS 220 includes a plurality of SSCs 222, 224 and a plurality of BTSs 226, 228. However, the NSS 200 of the GSM network includes a GMSC (Gateway Mobile Services Switching Center) 202, an MSC 204, an EIR (Equipment Identity Register) 206, an AC (Authentication Center) 208, an SC (Service center) 210, an OMC (Operation and Maintenance Center) 212, an HLR (Home Location Register) 214 and a VLR (Visitor Location Register) 216. To establish a requested call, the GSM system first designates a GMSC 202. The designated GMSC 202 then checks a phone number of the GMS subscriber to detect an accurate HLR 214. The GMSC 202 is connected to the public network 300, 310, for communication of a call.

The public network 300, 310 for connecting the CDMA system to the GSM system includes a PSTN (Public Switched Telephone Network), a PSPDN (Pack Switched & Public Data Network), an ISDN (Integrated Service Digital Network), an ATM (Asynchronous Transfer Mode) network, etc.

To enable a GSM subscriber to use his own SIM card in a CDMA service area, there is required a mutual agreement between a CDMA system and a GSM system. For example, upon receipt of user information, the CDMA system determines country and network information of the user by analyzing the received user information, and makes the call charge according to a charging system of the corresponding country. Further, according to the present invention, the public networks 300, 310 connected to the CDMA system and the GSM system should perform a procedure for determining whether a terminal mounted with a SIM card is located in the CDMA service area.

Now, a detailed description will be made regarding operations performed in a CDMA terminal, a BSS of the CDMA network and an NSS of the GSM network, in the case where a GSM subscriber uses a CDMA terminal mounted with his own SIM card in a CDMA service area. Herein, the NSS, BSS and OSS of the CDMA system will be referred to as a CDMA subsystem; the NSS, BSS and OSS of the GSM system will be referred to as a GSM subsystem.

Now, with reference to FIGS. 3 to 7, a description will be made regarding operations performed in the CDMA terminal mounted with the SIM card, the BSS of the CDMA network and the NSS of the GSM network, when a GSM subscriber inserted his own SIM card in the CDMA terminal in a CDMA service area.

Figure 5:
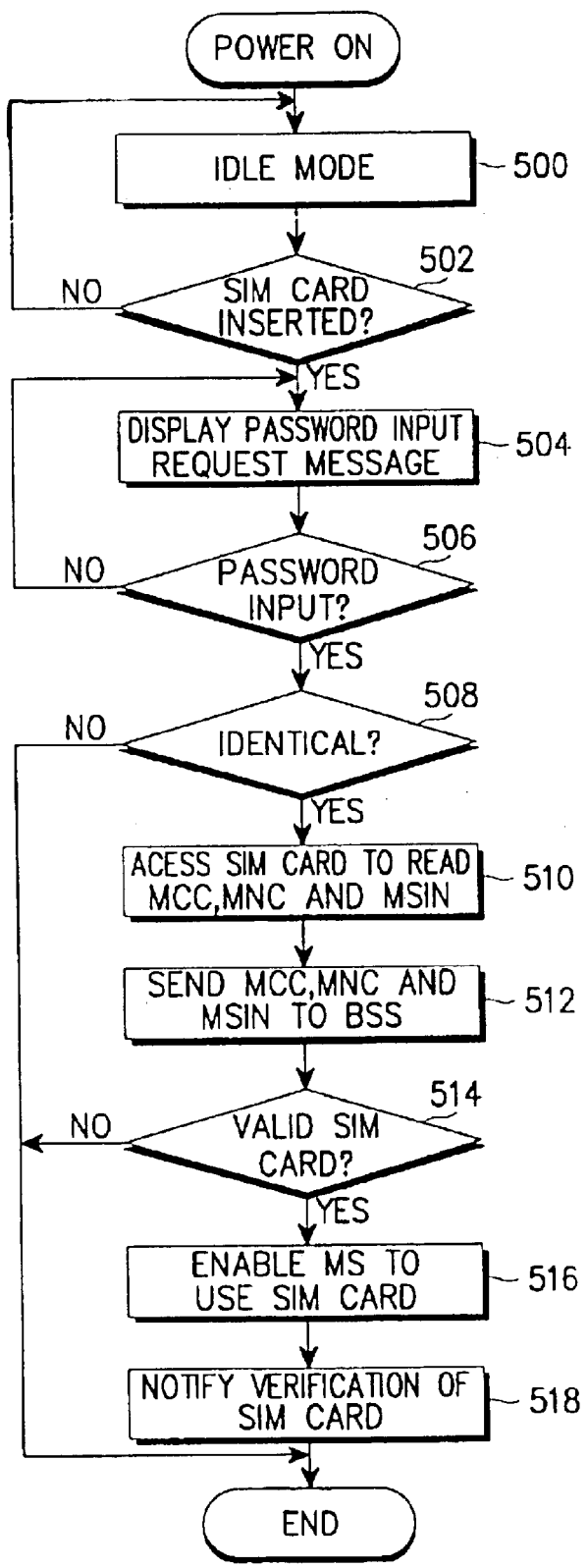
FIG. 5 is a flow chart illustrating an initialization procedure performed in a CDMA terminal mounted with a SIM card according to an embodiment of the resent invention.
Figure 8:
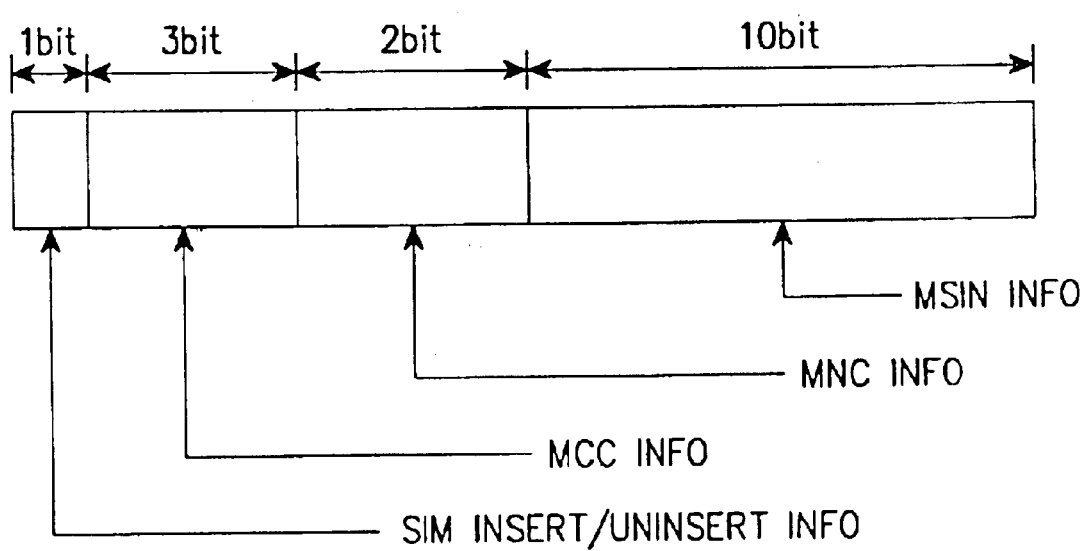
FIG. 8 is a diagram illustrating a format of data transmitted from a CDMA terminal to a BSS of a CDMA network in an initialization procedure according to an embodiment of the present invention.

FIG. 5 shows an initialization procedure performed in a CDMA terminal mounted with a SIM card according to an embodiment of the present invention. When a GSM subscriber inserts his own SIM card 62 in a CDMA terminal in a CDMA service area in a power-on state, the controller 42 of the CDMA terminal detects insertion of the SIM card 62 through the SIM interface 60 in an idle mode of operation, in steps 500 and 502. Upon detecting insertion of the SIM card 62, the controller 42 displays a password input request message on the display 38 in step 504. When the user inputs his password in response to the password input request message in step 506, the controller 42 determines in step 508 whether the input password is identical to its own password. That is, the controller 42 reads its own password from the SIM card 62 through the SIM interface 60 and compares it with the input password to determine whether they are identical to each other. When the input password is identical to its own password, the controller 42 of the CDMA terminal proceeds to step 510 to read an MCC (Mobile Country Code), an MNC (Mobile Network Code) and an MSIN (Mobile Subscriber Identification Number) from the SIM card 62 by means of the SIM interface 60. The MCC, MNC and MSIN are included in the IMSI (International Mobile Subscriber Identity). Thereafter, in step 512, the controller 42 transmits the MCC, MNC and MSIN to a BSS of the CDMA network in a data format, of FIG. 8. Referring to FIG. 8, the data format includes 1-bit SIM insert/uninsert information, 3-bit MCG information, 2-bit MNC information and 10-bit MSIN information.

Figure 6:
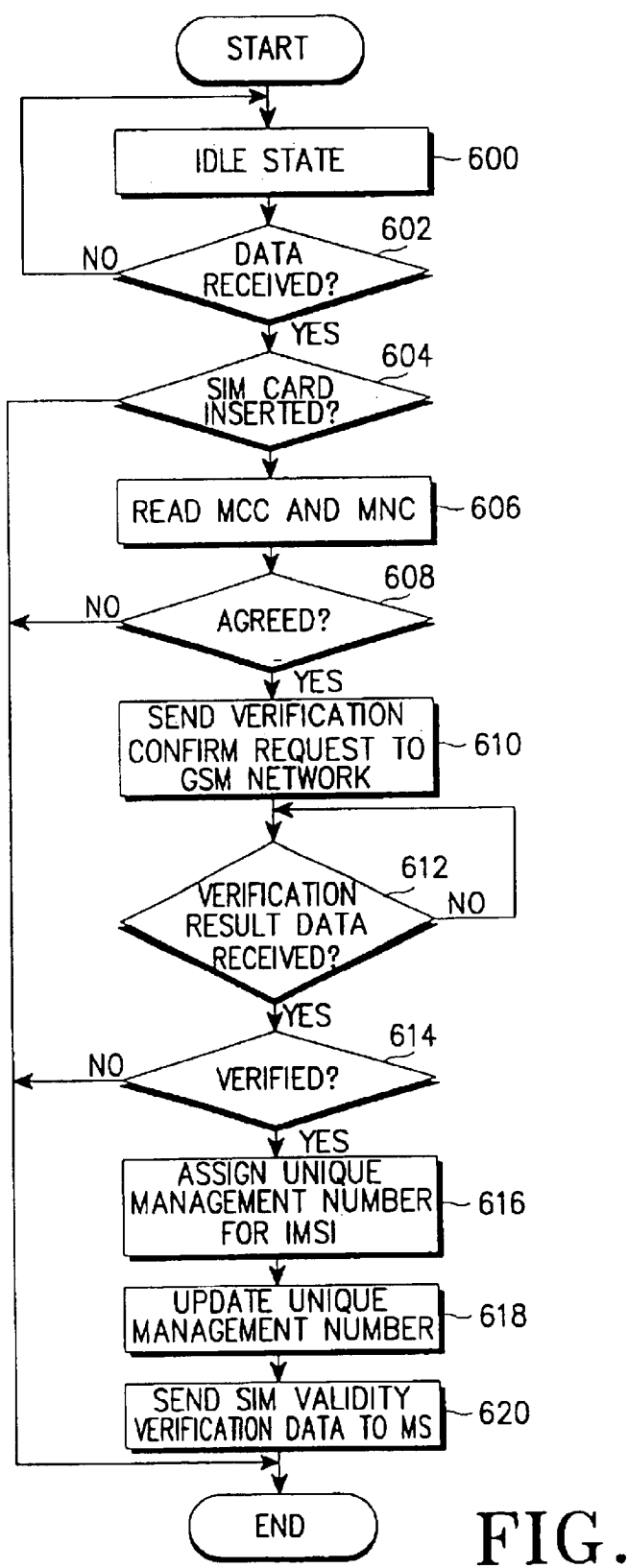
FIG. 6 is a flow chart illustrating an initialization procedure performed in a base station subsystem (BSS) of a CDMA network when a SIM card is mounted in a CDMA terminal, according to an embodiment of the present invention.

FIG. 6 illustrates an initialization procedure performed in a BSS of a CDMA network when the SIM card is mounted in the CDMA terminal, according to an embodiment of the present invention. Upon receipt of data (i.e., MCC, MNC and MSIN) in an idle state of step 600, the BSS of the CDMA network detects receipt of the data in step 602. Upon detecting receipt of the data, the BSS determines in step 604 whether the SIM card 62 is inserted in the CDMA terminal depending on a status of the SIM insert/uninsert information bit in the received data. Upon detecting insertion of the SIM card 62 in the CDMA terminal, the BSS of the CDMA network extracts an MCC and an MNC from the received data in step 606, to detect a country and a network type of the subscriber whose SIM card 62 is presently inserted in the CDMA terminal. Thereafter, the BSS determines in step 608 whether the detected country and network type are agreed country and network type. In the exemplary embodiment, the BSS of the CDMA network has a memory table for storing a country, a network type and agreement/non-agreement information with respect to the MCC and MNC information. Therefore, the BSS of the CDMA network can detect the country and the network type in step 606 and determines whether the detected country and network type are agreed ones, in step 608, using the MCC and MNC information extracted from the received data and the memory table prepared therein. When the detected country and network type are agreed, the BSS extracts MSIN information from the received data and sends a verification confirm request for the MSIN information to the GSM network, in step 610. For verification confirm request, the BSS of the CDMA network sends data using the country and network type information, so that it may connect with an MSC of the GSM network, which verifies the MSIN information. With respect to data transmission path during the verification confirm request, the data is transmitted from the BSS and the NSS of the CDMA network to the NSS of the GSM network via the public networks, as illustrated in FIG. 4. As stated above, the public network includes a PSTN (Public Switched Telephone Network), a PSPDN (Pack Switched & Public Data Network), an ISDN (Integrated Service Digital Network), an ATM (Asynchronous Transfer Mode) network, etc.

Upon receipt of the verification confirm request, the GMSC of the GSM network sends verification confirm request data to the MSC of the GSM network using the country and network type information, and the MSC of the GSM network then determines verification using the HLR. A detailed description will be made hereafter with reference to FIG. 7.

Figure 7:
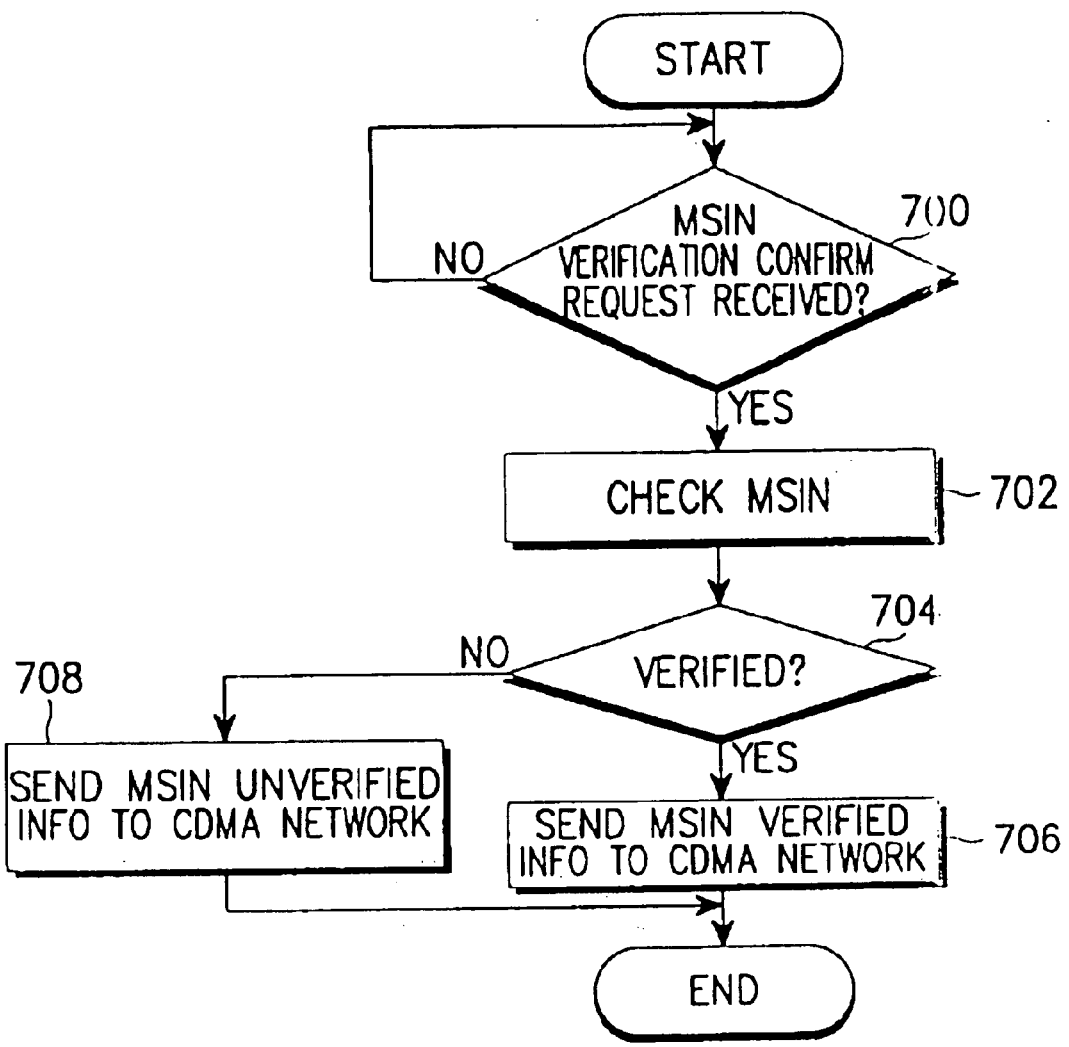
FIG. 7 is a flow chart illustrating an initialization procedure performed in a Gateway Mobile Services Switching Center (GMSC) of a GSM network when a SIM card is mounted in a CDMA terminal, according to an embodiment of the present invention.

FIG. 7 illustrates an initialization procedure performed in a GMSC of a GSM network when the SIM card is inserted in the CDMA terminal, according to an embodiment of the present invention.

The NSS of the GSM network determines in step 700 whether the MSIN verification confirm request is received or not. Upon receipt of the MSIN verification confirm request, the NSS of the GSM network verifies the verification confirm-requested MSIN using the HLR in step 702. Thereafter, the NSS determines in step 704 whether the HLR has verified the MSIN. When the MSIN is successfully verified, the NSS of the GSM network sends MSIN verified information to the CDMA network in step 706. However, when the MSIN is not verified, the NSS sends MSIN unverified information to the CDMA network in step 708.

The BSS of the CDMA network then performs an operation according to the MSIN verification results. This operation is performed in steps 612 to 620 of FIG. 6.

Turning back to FIG. 6, the BSS of the CDMA network determines in step 612 whether the MSIN verification result data is received from the GSM network. Upon receipt of the MSIN verification result data, it is determined in step 614 whether the received MSIN verification result data represents successful verification of the MSIN. When the received MSIN verification result data represents successful verification of the MSIN, the BSS of the CDMA network assigns a unique management number for the IMSI (i.e., MCC+MNC+MSIN) in step 616. Thereafter, the BSS updates the unique management number to the BSS, NSS and the public network in step 618. Further, in step 620, the BSS of the CDMA network sends verification data representing validity of the mounted SIM card to the CDMA terminal mounted with the SIM card.

Upon receipt of the verification data representing validity of the mounted SIM card from the BSS of the CDMA network, the CDMA terminal is enabled to notify the user that the mounted SIM card is available. This operation is performed in steps 514 to 518 of FIG. 5.

Referring back to FIG. 5, the controller 42 of the CDMA terminal determines in step 514 whether the SIM validity verification data is received from the BSS of the CDMA network. Upon receipt of the SIM validity verification data, the procedure proceeds to step 516 where the controller 42 enables the CDMA terminal to use the mounted SIM card. Thereafter, in step 518, the controller 42 notifies the user that the mounted SIM card has been verified, using the display 38 and/or the speaker SP. For example, a message "SIM CARD AVAILABLE" may be displayed on the display 38. By way of such initialization procedures, the user can use a CDMA terminal in which his own SIM card is mounted, in making a phone call to the other party or answering a call incoming from the other party.

Figure 9:
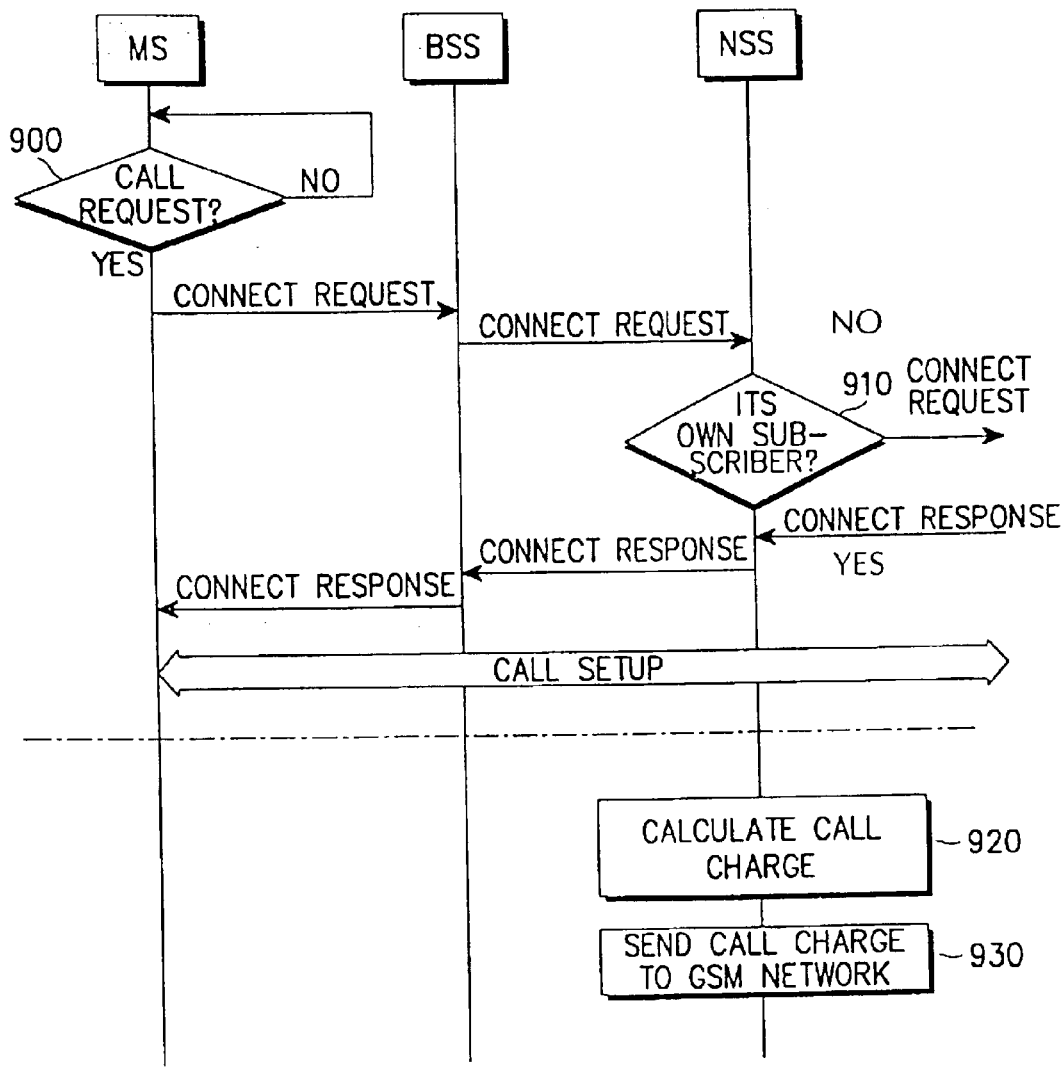
FIG. 9 is a flow chart illustrating a communication protocol when a GSM subscriber makes a phone call to another subscriber using a CDMA terminal mounted with his own SIM card.

First, with reference to FIG. 9, a detailed description will be made regarding a case where a GSM subscriber makes a phone call to the other party using a CDMA terminal in which his own SIM card is mounted. When the user sends a call request to the other party using a CDMA terminal (or mobile station (MS)) mounted with his own SIM card (Step 900), the CDMA terminal sends a connect request message to a BSS and an NSS of the CDMA network. An MSC in the NSS then determines whether the user is its own subscriber (Step 910). If the user is its own subscriber, the MSC in the NSS sends a connect response to the CDMA terminal via the BSS. However, when the user is not its own subscriber, the MSC sends the connect request to another MSC or an external network (e.g., public network). Upon receipt of a connect response from the other party via another MSC or the external network, the MSC in the NSS sends the connect response to the CDMA terminal via the BSS, thereby setting up a call.

In the meantime, when the call is ended, the NSS of the CDMA network sends a call time (or air time) and the other party's phone number to an OSS, so as to allow the OSS to calculate the call charge according to an agreement (Step 920). When the OSS completes calculation of the call charge, the NSS sends the call charge information to a corresponding GSM network (Step 930). An NSS of the GSM network then bills the SIM card's user for the call charge. Next, a detailed description will be made regarding a case where the other party makes a call to a subscriber of a CDMA terminal mounted with a SIM card. In this case, an operation depends on whether the other party belongs to a CDMA network, a GSM network or an external wire network (i.e., public network).

A. Case 1

Figure 10:
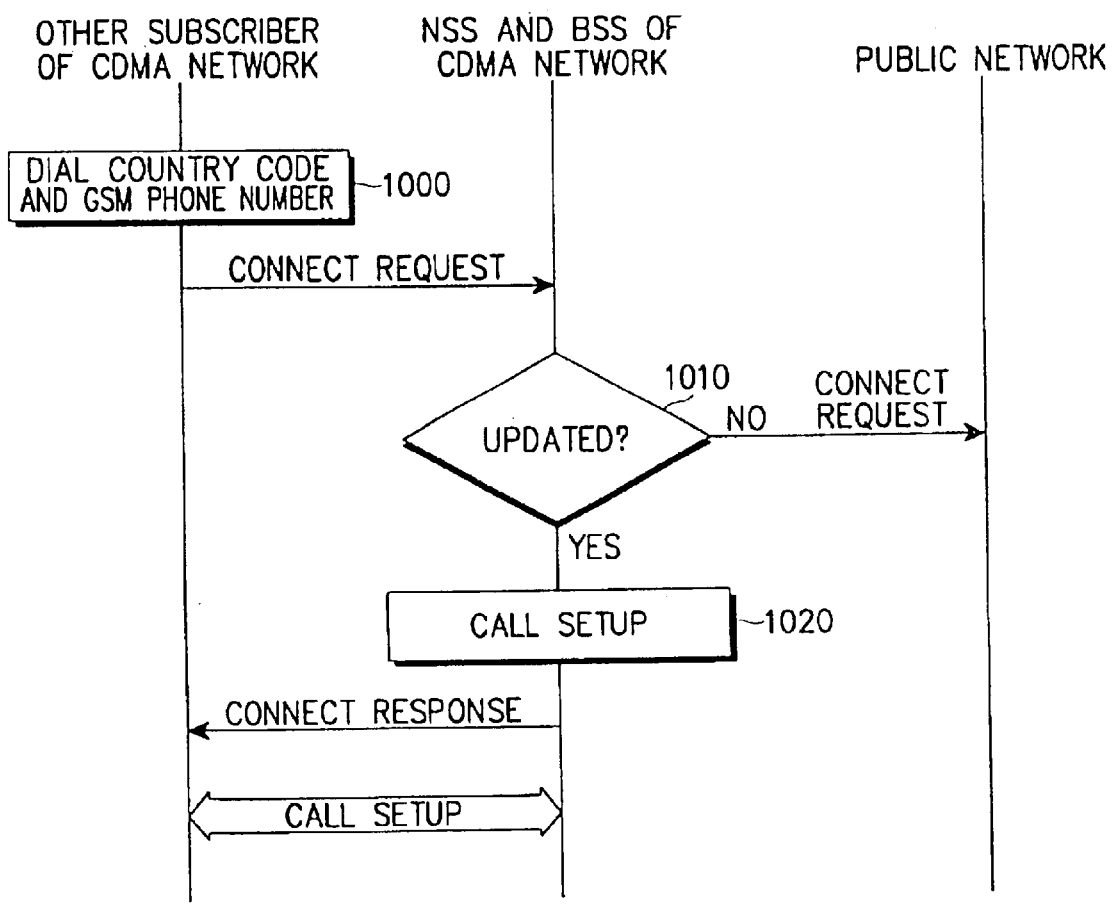
FIG. 10 is a flow chart illustrating a communication protocol when the other subscriber of a CDMA network makes a phone call to a CDMA terminal mounted with a SIM card.

FIG. 10 illustrates a communication protocol when the other subscriber of a CDMA network makes a phone call to a CDMA terminal mounted with a SIM card. When the CDMA subscriber dials by pressing a country code and a GSM phone number (Step 1000) to send a call connect request, the NSS and BSS of the CDMA network determine whether a unique management number for the GSM phone number has been internally updated, in response to the connect request from the CDMA terminal (Step 1010). When the unique management number has been updated, the NSS and BSS of the CDMA network control a call setup using the updated unique management number (1020), and send a connect response to the other subscriber of the CDMA network. Subsequently, a call is set up between the other subscriber of the CDMA network and the CDMA terminal mounted with the SIM card.

B. Case 2

Figure 11:
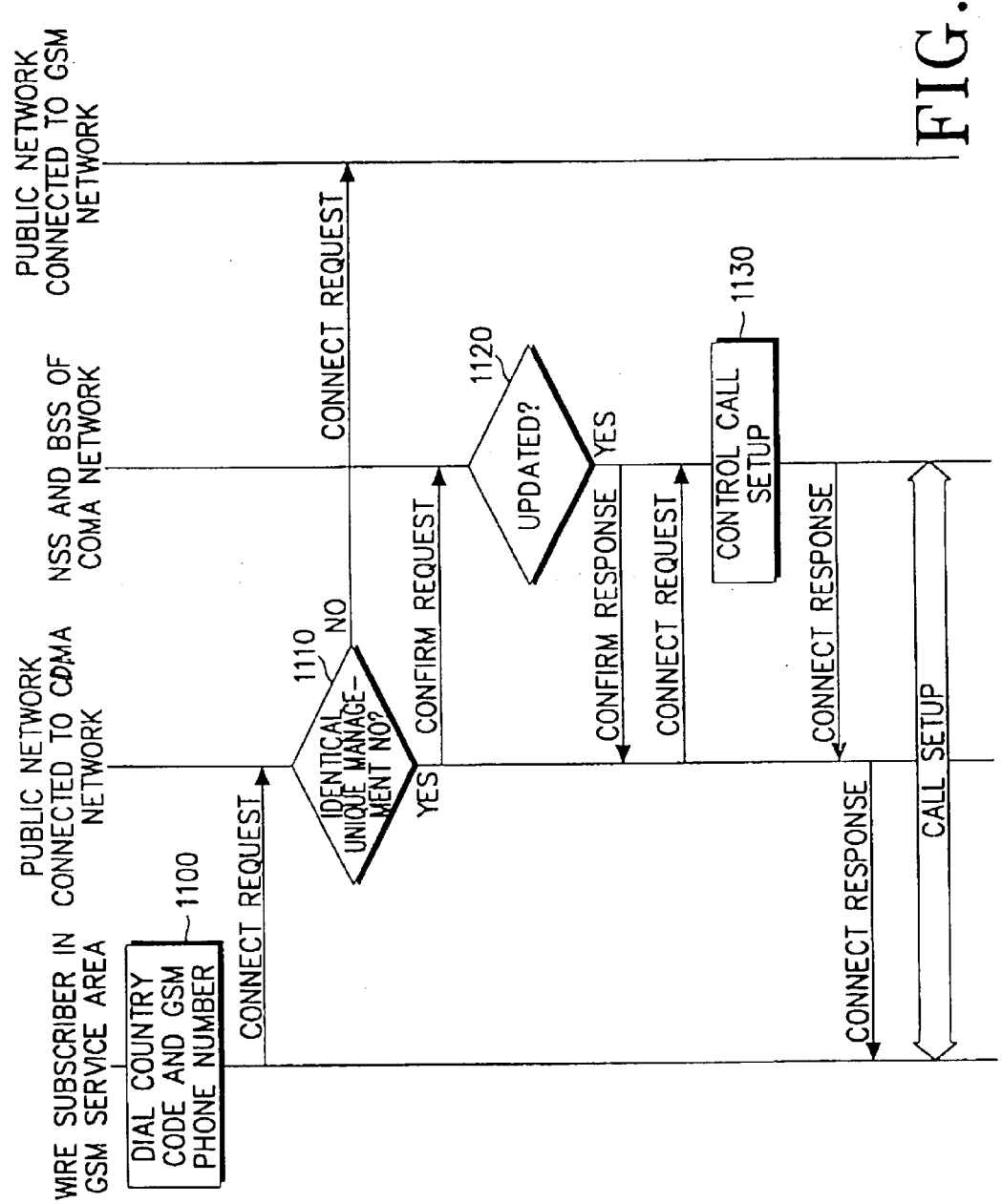
FIG. 11 is a flow chart illustrating a communication protocol when a wire subscriber in a CDMA service area makes a phone call to a CDMA terminal mounted with a SIM card.

FIG. 11 illustrates a communication protocol when a wire subscriber in a CDMA service area makes a phone call to a CDMA terminal mounted with a SIM card. When the, wire subscriber dials by pressing a country code and a GSM phone number (Step 1100) to send a call connect request to a public network connected to the CDMA network, the public network connected to the CDMA network determines whether the CDMA network has a unique management number for the GSM phone number (Step 1110). If the CDMA network has a unique management number, the public network sends a confirm request to the NSS and BSS of the CDMA network, and the NSS and BSS of the CDMA network determine whether the unique management number has been updated (Step 1120). When the unique management number has not been updated, a corresponding GSM service is performed. When the unique management number has been updated, the NSS and BSS of the CDMA network send a confirm response to the public network connected to the CDMA network. The public network connected to the CDMA network then sends a connect request to the NSS and BSS of the CDMA network. Upon receipt of the connect request, the NSS and BSS of the CDMA network control a call setup using the updated unique management number (1130); and send a connect response to the wire network subscriber in the CDMA service area via the public network connected to the CDMA network. Subsequently, a call is set up between the wire subscriber in the CDMA service area and the CDMA terminal mounted with the SIM card.

C. Case 3

Figure 12:
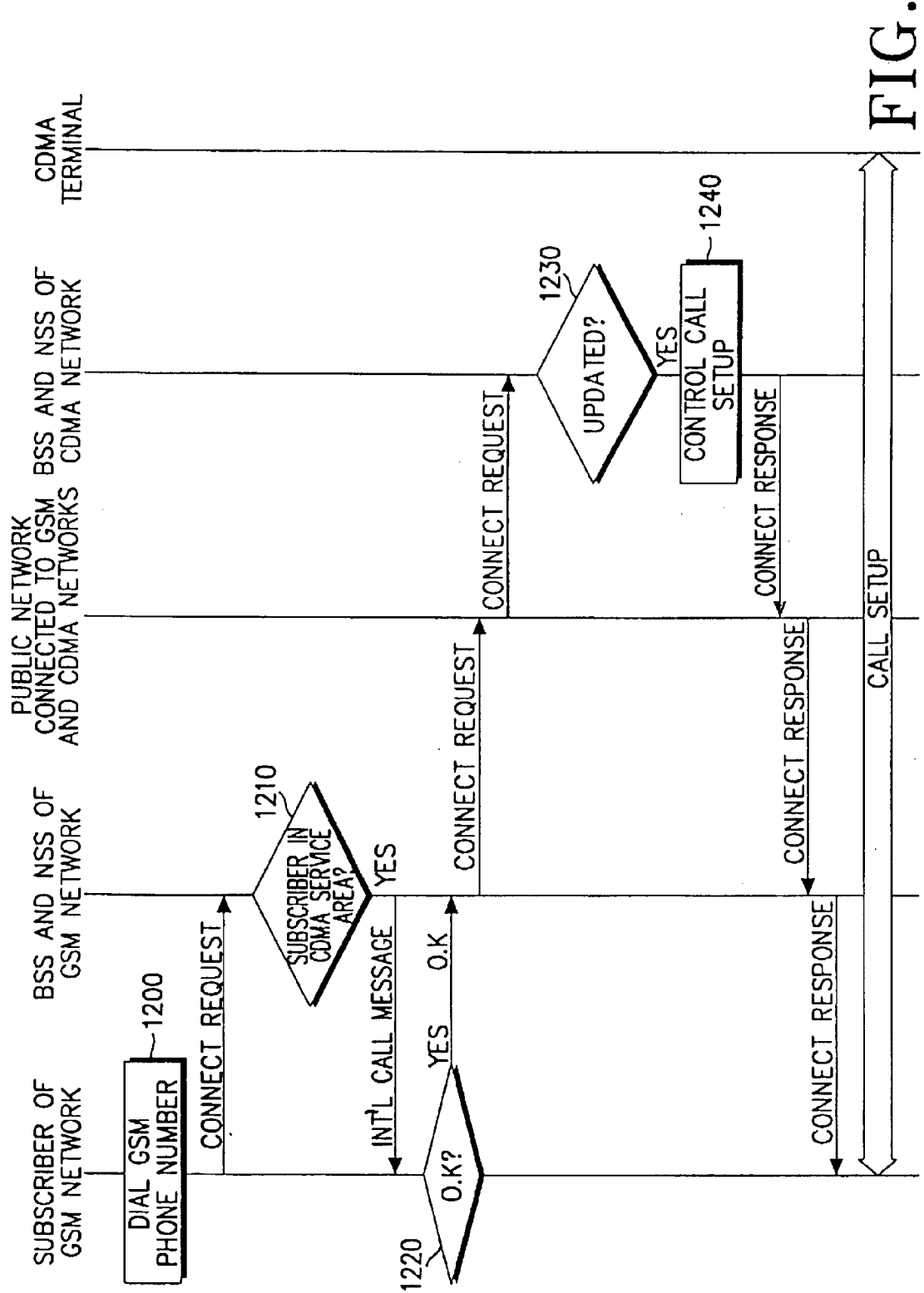
FIG. 12 is a flow chart illustrating a communication protocol when a GSM subscriber makes a phone call to a CDMA terminal mounted with a SIM card.

FIG. 12 illustrates a communication protocol when a GSM subscriber makes a phone call to a CDMA terminal mounted with a SIM card. When the GSM subscriber dials by pressing a GSM phone number (Step 1200) to send a call connect request to the BSS and NSS of the GSM network, the BSS and NSS of the GSM network determine whether a subscriber for the dialed GSM phone number is in the CDMA service area, in response to the connect request (Step 1210). When the GSM subscriber is in the CDMA service area, the BSS and NSS of the GSM network notify the GSM subscriber that the present call is an international call. If the GSM subscriber requests (or accepts) the international call in response to the international call notification (Step 1220), the BSS and NSS of the GSM network send a connect request to the NSS and BSS of the CDMA network via a public network connected to the GSM network and the CDMA network. The NSS and BSS of the CDMA network then determine whether a unique management number for the GSM phone number has been updated, in response to the connect request (Step 1230). When the unique management number has been updated, the NSS and BSS of the CDMA network control a call setup using the updated unique management number (1240), and send a connect response to the .GSM subscriber. When the unique management number has not been updated, a corresponding GSM service is performed. Subsequently, a call is set up between the GSM subscriber in the CDMA service area and the CDMA terminal mounted with the SIM card.

D. Case 4

Figure 13:
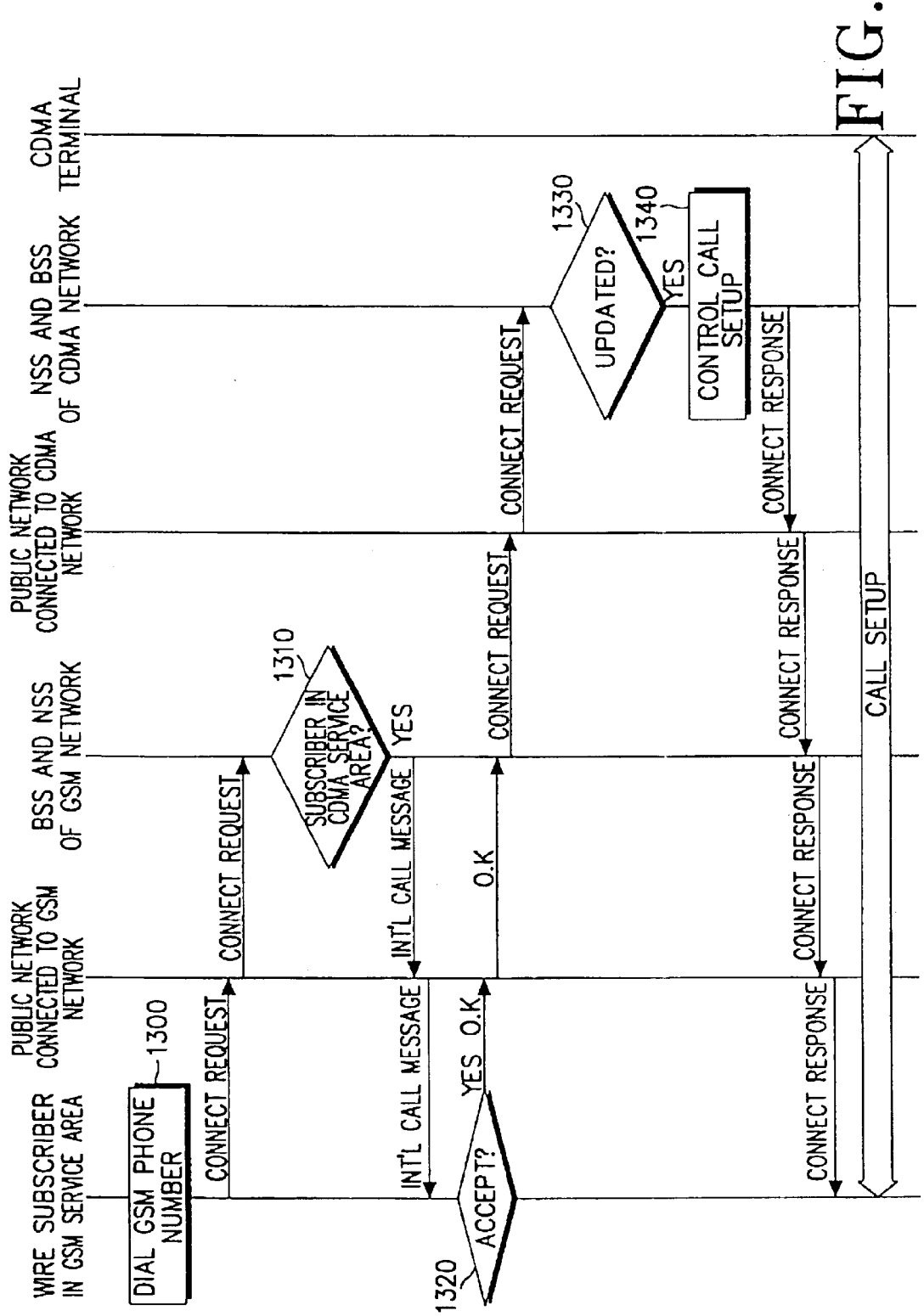
FIG. 13 is a flow chart illustrating a communication protocol when a wire subscriber in a GSM service, area makes a phone call to a CDMA terminal mounted with a SIM card.

FIG. 13 illustrates a communication protocol when a wire subscriber in a GSM service-area makes a phone call to a CDMA terminal mounted with a SIM card. When the wire subscriber in the GSM service area dials by pressing a GSM phone number (Step 1300) to send a call connect request to a public network connected to the GSM network, the public network connected to the GSM network transfers the connect request to the BSS and NSS of the GSM network. The BSS and the NSS of the GSM network then determine whether a subscriber for the dialed GSM phone number is in the CDMA service area, in response to the connect request from the wire subscriber in the GSM service area (Step 1310). If the subscriber for the GSM phone number is in the CDMA service area, the BSS and NSS of the GSM network notify the wire subscriber in the GSM service area that the present call is an international call via the public network connected to the GSM network. If the wire subscriber in the GSM service area accepts the international call in response to the international call notification (Step 1320), the BSS and NSS of the GSM network send a connect request to the NSS and BSS of the CDMA network via a public network connected to the CDMA network. The NSS and BSS of the CDMA network then determines whether a unique management number for the GSM phone number has been updated, in response to the connect request (Step 1330). When the unique management number has been updated, the NSS and BSS of the CDMA network control a call setup using the updated unique management number (1340), and send a connect response to the wire subscriber in the GSM service area. Subsequently, a call is set up between the wire subscriber in the GSM service area and the CDMA terminal mounted with the SIM card.

Figure 14:
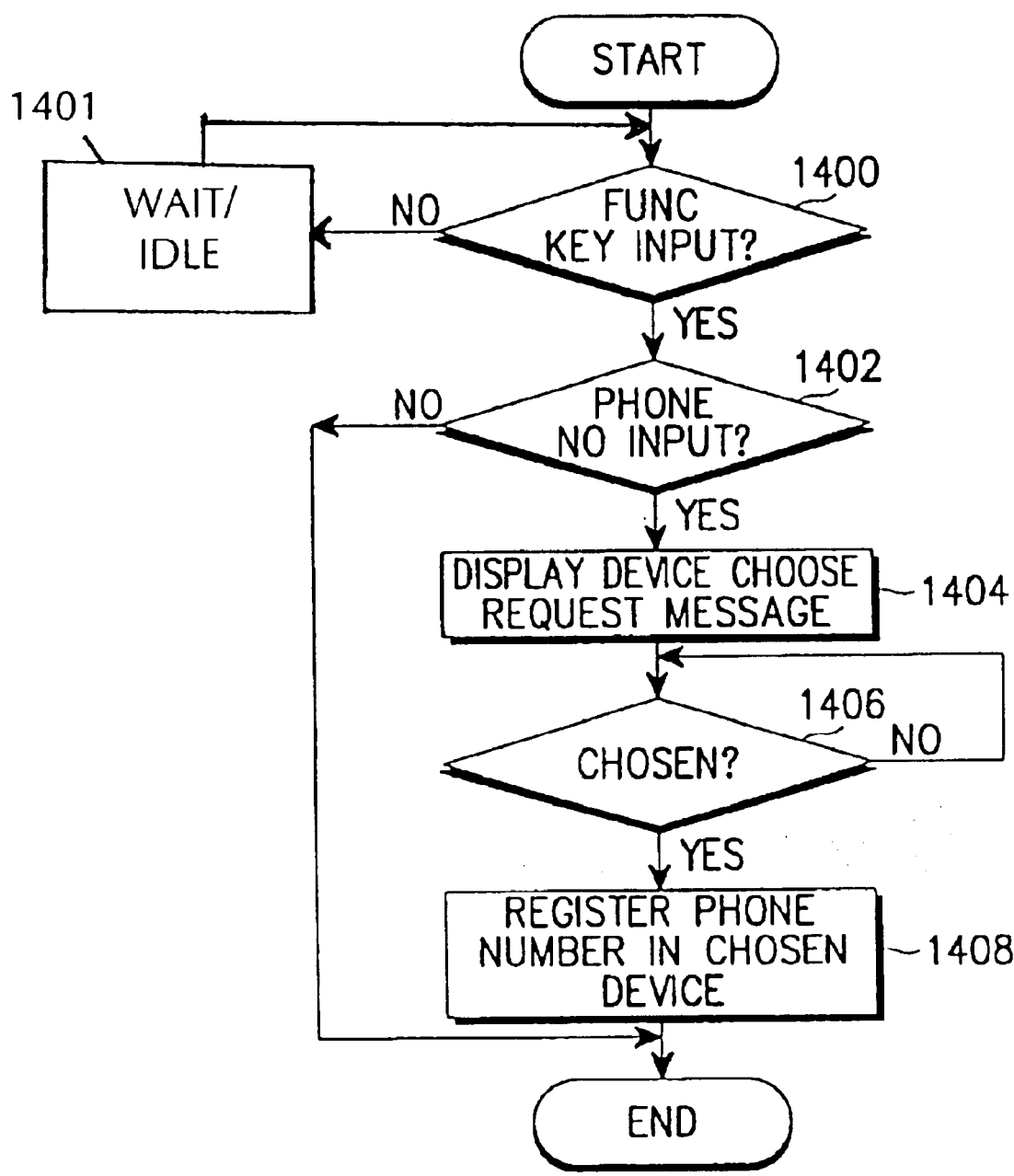
FIG. 14 is a flow chart illustrating a phone number registering procedure for an additional service according to an embodiment of the present invention.
Figure 15:
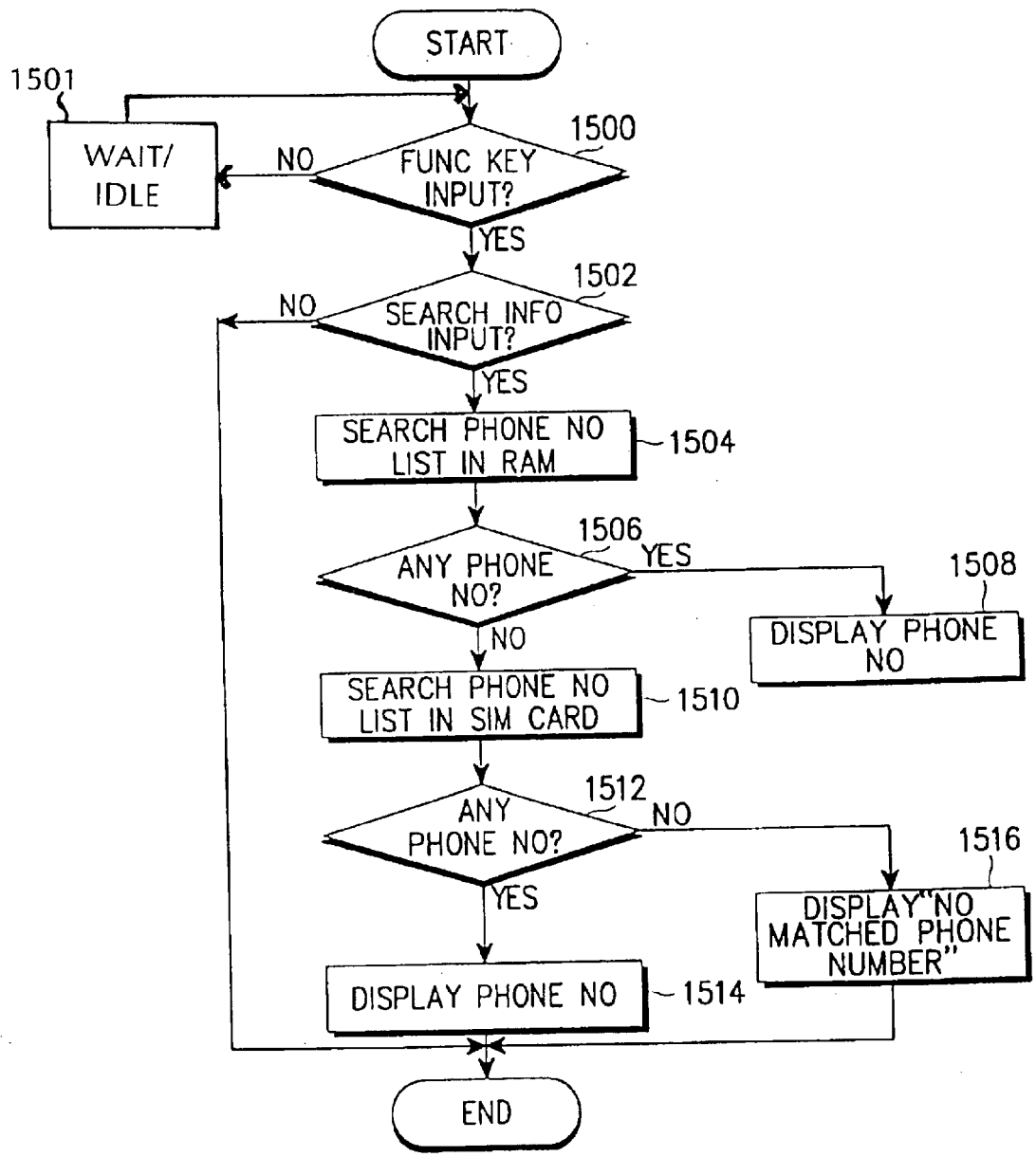
FIG. 15 is a flow chart illustrating a procedure for searching phone numbers registered for an additional service according to an embodiment of the present invention.

Next, with reference to FIGS. 14 and 15, a detailed description will be made regarding operations of registering a phone number for an additional service (e.g., abbreviated dialing) using the CDMA terminal mounted with the SIM card and performing the additional service using the registered phone number. FIG. 14 illustrates a phone number registering procedure for an additional service according to an embodiment of the present invention. FIG. 15 illustrates a procedure for retrieving the phone number registered for an additional service according to an embodiment of the present invention.

First, with reference to FIGS. 14 and 3, a detailed description will be made regarding an operation of registering a phone number to perform an abbreviated dialing function using the CDMA terminal mounted with the SIM card. When the user inputs (or presses) a phone number registration function key using the key input unit 40, the controller 42 in the MSM 26 determines in step 1400 whether the phone number registration function key is input. If the function key is not input, the controller 42 waits in Step 1401 for a period of time and then proceeds to step 1400 to determine whether the phone number registration function key is input. Upon detection of the phone number registration function key input, the controller 42 determines in step 1402 whether a phone number to be registered is input. When the phone number is input, the controller 42 displays on the display 38 a message requesting the user to choose a device where to register the phone number, in step 1404. For example, a message 1. SIM CARD, 2. INTERNAL MEMORY may be displayed. The user will then determine whether he desires to register the phone number in the SIM card or the internal memory. The controller 42 determines in step 1406 whether the user has chosen one of registration devices by pressing an associated numeric key. Upon detection of the numeric key input, the controller 42 registers the phone number in the selected device in step 1408. That is, when the user chooses the SIM card, the controller 42 registers the phone number in the SIM card 62; otherwise, when the user chooses the internal memory, the controller 42 registers the phone number in the internal memory, i.e., the RAM 32. The phone number mentioned in FIG. 14 can be a phone number for abbreviating dialing or other additional services.

Next, with reference to FIGS. 15 and 3, a detailed description will be made regarding an operation of retrieving a phone number for abbreviated dialing using a CDMA terminal mounted with a SIM card. When the user inputs a phone book search function key using the key input unit 40, the controller 42 in the MSM 26 determines in step 1500 whether a phone book search function key is input. If the function key is not input, the controller 42 waits in Step 1501 for a period of time and then proceeds to step 1500 to determine whether the phone book search function key is input. Upon detection of the phone book search function key input, the controller determines in step 1502 whether search information is: received or not. Upon receipt of the search information, the controller 42 searches a list of phone numbers registered in the internal memory, i.e., the RAM 32, in step 1504. Thereafter, it is determined in step 1506 whether the RAM 32 has a phone number corresponding to the received search information. When the RAM 32 has a phone number corresponding to the search information, the controller 42 retrieves the phone number from the RAM 32 and displays the retrieved phone number on the display 38 in step 1508. However, when the RAM 32 does not have a phone number corresponding to the search information, the controller 42 searches a list of phone numbers registered in the SIM card 62 in step 1510. After the search, the controller 42 determines in step 1512 whether the SIM card 62 has a phone number corresponding to the search information. When the SIM card 62 has a phone number corresponding to the search information, the controller 42 retrieves the phone number from the SIM card 62 and displays the retrieved phone number on the display 38, in step 1514. However, when the SIM card 62 does not have a phone number corresponding to the search information, the controller 42 displays on the display 38 a message indicating that there is no matched phone number, in step 1516.

As can be appreciated from the foregoing descriptions, a GSM subscriber may mount his own SIM card in a CDMA terminal in a CDMA service area, to use various SIM information stored in the SIM card.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for allowing a GSM (Global System for Mobile communication) subscriber to use a SIM (Subscriber Identity Module) card in a CDMA (Code Division Multiple Access) service area, the system comprising:
   a CDMA terminal in which the SIM card can be mounted, including a SIM interface for interfacing between the SIM card and a controller of the CDMA terminal, said CDMA terminal reading unique subscriber information for SIM card verification from the SIM card and sending the read unique subscriber information when the SIM card is mounted therein, and enabling the SIM card upon receipt of verification for the SIM card;
   a CDMA subsystem for sending a verification confirm request for the SIM card to a GSM subsystem using the unique subscriber information and information about a predetermined agreement with a GSM system upon receipt of the unique subscriber information for SIM card verification; assigning a unique virtual management number for the CDMA terminal mounted with the SIM card and sending SIM card verification to the CDMA terminal when the GSM subsystem verifies the SIM card; calculating a call charge based on information required for call charge upon completion of a call; and sending the calculated call charge to the GSM system;
   the GSM subsystem verifying the SIM card in response to the verification confirm request for the SIM card and sending the verification result to the CDMA subsystem; and
   a public network for connecting the CDMA subsystem and the GSM subsystem.

2. The system as claimed in claim 1, wherein the unique subscriber information for SIM card verification is included in an IMSI (International Mobile Subscriber Identity).

3. The system as claimed in claim 2, wherein the IMSI includes an MCC (Mobile Country Code), an MNC (Mobile Network Code) and an MSIN (Mobile Subscriber Identification Number).

4. The system as claimed in claim 1, wherein upon verification of the SIM card, the CDMA terminal notifies the user that the SIM card has been verified and is operable.

5. The system as claimed in claim 4, wherein the CDMA terminal notifies the user of verification of the SIM card using a display and/or a speaker.

6. The system as claimed in claim 1, wherein the information about the agreement includes a country of the SIM card subscriber, a network type to which the SIM card subscriber belongs, and data as to whether an agreement has been made or not.

7. The system as claimed in claim 1, wherein the public network includes a PSTN (Public Switched Telephone Network), a PSPDN (Pack Switched & Public Data Network), an ISDN (Integrated Service Digital Network) and an ATM (Asynchronous Transfer Mode) network.

8. A method for allowing a GSM subscriber to use a SIM card in a CDMA service area using a CDMA terminal, the CDMA terminal including a detachable SIM card and a SIM interface for interfacing between the SIM card and the CDMA terminal, the method comprising the steps of:
   a) sending a verification confirm request for the SIM card to a CDMA subsystem using unique subscriber information stored in the SIM card mounted in the CDMA terminal;
   b) upon receipt of the unique subscriber information for SIM card verification, sending, at the CDMA subsystem, a verification confirm request to a GSM subsystem using the unique subscriber information and information about a predetermined agreement with the GSM system;
   c) sending a verification result for the SIM card from the GSM subsystem to the CDMA subsystem via a public network in response to the verification confirm request; a
   d) upon receipt of the verification result for the SIM card from the GSM subsystem, assigning, at the CDMA subsystem, a unique virtual management number for the CDMA terminal mounted with the SIM card and sending SIM card verification result to the CDMA terminal so as to enable the CDMA terminal to use the SIM cards
   e) calculating, at the CDMA subsystem, a call charge based on information required for call charge upon completion of a call; and
   f) sending the calculated call charge to a GSM system via the public network.

9. The method as claimed in claim 8, further comprising the step of enabling the CDMA terminal to use the SIM card and notifying a user, as the SIM card verification result is transmitted to the CDMA terminal.

10. The method as claimed in claim 8, wherein step a) further comprises the steps of:
displaying a password input request message as the SIM card is mounted in the CDMA terminal;
determining whether the input password is identical to the password of the SIM card upon receipt of a password input by the user; and
sending a verification confirm request for the mounted SIM card to the CDMA subsystem using the unique subscriber information stored in the SIM card, when the input password is identical to the password of the SIM card.

11. The method as claimed in claim 8, wherein the unique subscriber information for SIM card verification is included in an IMSI.

12. The method as claimed in claim 11, wherein the IMSI includes an MCC, an MNC and an MSIN.

13. The method as claimed in claim 8, wherein the information about the agreement includes a country of the SIM card subscriber, a network type to which the SIM card subscriber belongs, and data as to whether an agreement has been made or not.

14. The method as claimed in claim 8, wherein the public network includes a PSTN, a PSPDN, an ISDN and an ATM network.

15. A method for allowing a subscriber of a CDMA terminal mounted with a SIM card to make a phone call to another subscriber in a system which allows the subscriber to use the SIM card in a CDMA service area using a CDMA terminal, the CDMA terminal including a detachable SIM card and a SIM interface for interfacing between the SIM card and the CDMA terminal, the method comprising the steps of:
determining, at a CDMA subsystem, whether the other subscriber is a subscriber of the same CDMA subsystem in response to a call request from the CDMA terminal mounted with the SIM card;
setting up a call to the other subscriber using a corresponding network, when the other subscriber is a subscriber of the same CDMA subsystem;
calculating, at the CDMA subsystem, a call charge based on information required for call charge upon completion of the call; and
sending the calculated call charge to a GSM system via the public network.

16. A method for allowing another subscriber of a CDMA network to make a phone call to a subscriber of a CDMA terminal mounted with a SIM card in a system which allows the subscriber to use the SIM card in a CDMA service area using a CDMA terminal, the CDMA terminal including a detachable SIM card and a SIM interface for interfacing between the SIM card and the CDMA terminal, the method comprising the steps of:
allowing the other subscriber of the CDMA network to send a call request by inputting a country code and a GSM phone number for a user of the SIM card;
determining, at a CDMA subsystem, whether a unique management number for the country code and the GSM number has been updated, in response to a call request; and
setting up a call between the other subscriber of the CDMA network and the CDMA terminal mounted with the SIM card when the unique management number has been updated.

17. A method for allowing a wire subscriber in a CDMA service area to make a phone call to a subscriber of a CDMA terminal mounted with a SIM card in a system which allows the subscriber to use the SIM card in a CDMA service area using a CDMA terminal, the CDMA terminal including a detachable SIM card and a SIM interface for interfacing between the SIM card and the CDMA terminal, the method comprising the steps of:
allowing the wire subscriber to send a call request by inputting a country code and a GSM phone number for a user of the SIM card;
determining, at a wire network and a CDMA subsystem, whether a unique management number for the country code and the GSM number has been updated, in response to a call request; and
setting up a call between the wire subscriber in the CDMA service area and the CDMA terminal mounted with the SIM card when the unique management number has been updated.

18. A method for allowing a GSM subscriber in a CDMA service area to make a phone call to a subscriber of a CDMA terminal mounted with a SIM card in a system which allows the subscriber to use the SIM card in a CDMA service area using a CDMA terminal, the CDMA terminal including a detachable SIM card and a SIM interface for interfacing between the SIM card and the CDMA terminal, the method comprising the steps of:
allowing the GSM subscriber to send a call request by inputting a GSM phone number for a user of the SIM card;
determining whether a subscriber for the GSM phone number is in the CDMA service area, in response to the call request;
notifying the GSM subscriber that a present call is an international call, when the subscriber for the GSM phone number is in the CDMA service area; and
setting up a call between the GSM subscriber and the CDMA terminal mounted with the SIM card via a public network, when the GSM subscriber accepts the international call.

19. A method for allowing a wire subscriber in a GSM service area to make a phone call to a subscriber of a CDMA terminal mounted with a SIM card in a system which allows the subscriber to use the SIM card in a CDMA service area using a CDMA terminal, the CDMA terminal including a detachable SIM card and a SIM interface for interfacing between the SIM card and the CDMA terminal, the method comprising the steps of:
allowing the wire subscriber to send a call request by inputting a GSM phone number for a user of the SIM card;
determining, at a wire network and a CDMA subsystem, whether a subscriber for the GSM phone number is in the CDMA service area, in response to a call request; and
notifying the wire subscriber that a present call is an international call, when the subscriber for the GSM phone number is in the CDMA service area; and
setting up a call between the wire subscriber in the GSM service area and the CDMA terminal mounted with the SIM card via a public network, when the wire subscriber accepts the international call.

20. A method for registering and searching a phone number for an additional service in a system which allows a subscriber to use the SIM card in a CDMA service area using a CDMA terminal, the CDMA terminal including a detachable SIM card and a SIM interface for interfacing between the SIM card and the CDMA terminal, the method comprising the steps of:

outputting a message requesting a user of the CDMA terminal to choose a device where to register a phone number, as the user inputs a phone number registration function key and a phone number to be registered;

registering the phone number in the SIM card or an internal memory according to the user's choice;

searching a list of phone numbers stored in the internal memory and the SIM card upon receipt of a phone book search function key and search information; and upon detection of a phone number corresponding to the search information, providing the phone number to the user.

21. A system for allowing a GSM (Global System for Mobile communication) subscriber to use a SIM (Subscriber Identity Module) card in a CDMA (Code Division Multiple Access) service area, the system comprising:

a CDMA terminal in which the SIM card can be mounted, said CDMA terminal reading unique subscriber information for SIM card verification from the SIM card and sending the read unique subscriber information, and enabling the SIM card upon receipt of verification for the SIM card;

a CDMA subsystem for sending a verification confirm request for the SIM card to a GSM subsystem using the unique subscriber information and information about a predetermined agreement with a GSM system upon receipt of the unique subscriber information for SIM card verification; assigning a unique virtual management number for the CDMA terminal mounted with the SIM card and sending SIM card verification to the CDMA terminal when the GSM subsystem verifies the SIM card; calculating a call charge based on information required for call charge upon completion of a call; and sending the calculated call charge to the GSM system;

the GSM subsystem verifying the SIM card in response to the verification confirm request for the SIM card and sending the verification result to the CDMA subsystem; and a public network for connecting the CDMA subsystem and the GSM subsystem.

\* \* \* \* \*